Patented Dec. 11, 1934

1,984,254

UNITED STATES PATENT OFFICE 1,984,254

PRESERVATION OF WOOD

Leo P. Curtin, Cranbury, N. J., and William Thordarson, New York, N. Y., assignors to The Western Union Telegraph Company, New York, N. Y., a corporation of New York No Drawing. Application July 20, 1933, Serial No. 681,398

14 Claims. (Cl. 99—12)

This invention relates to the preservation of wood and analogous vegetable fibrous materials, including fabricated products such as wall board, and is more particularly concerned with an improved solution for the impregnation of such materials.

In United States Letters Patent No. 1,659,135, Leo P. Curtin, one of the present applicants, has described solutions for the preservation of wood and the like which are capable of depositing zinc meta arsenite in or upon the wood. These solutions consist essentially of zinc acetate or salts capable of reacting to yield zinc acetate, such as zinc chloride or sulfate, and a soluble acetate, such as calcium acetate, arsenious oxid, and a volatile acid such as acetic acid. Such solutions upon exposure to the atmosphere lose acetic acid by evaporation thereby becoming less strongly acid or more basic whereby zinc meta arsenite forms and deposits. In use, the solutions are introduced into the wood in any suitable way, and then upon exposing the wood to the atmosphere the water and acetic acid content evaporates, depositing zinc meta arsenite in finely divided form in the pores and upon the fibers of the wood. Zinc meta arsenite is a salt having a very low solubility and remarkably high fungicidal and insecticidal properties.

Extensive use of the solutions described in said patent has taught that, although said solutions are satisfactory for most purposes, in some instances, for example, when the wood is to be used immediately after the impregnation, in places where it is exposed to wetting with water the deposition of the zinc meta arsenite is slower than is desirable. Some leaching of the solution occurs before the insoluble zinc meta arsenite forms and deposits. Also when the wood is subjected to kiln drying immediately after impregnation, the quick evaporation of the solution at elevated temperature prevents the complete reaction of the zinc and arsenic compounds therein to the formation of the insoluble zinc meta arsenite. The present invention therefore has for its object the provision of impregnating solutions of the same general type as those disclosed in said patent, but capable of depositing the zinc meta arsenite more quickly.

We have found that it is possible by certain modifications (to be described hereinafter) of the composition of the solutions disclosed in said patent to produce solutions which precipitate zinc meta arsenite in from one-half to one-fourth the time, or at from two to four times the rate of precipitation from the older solutions. The advantages of the more rapidly precipitating solutions are obvious, e. g. the wood may be put into service in wet locations or kiln dried much sooner after the impregnation without detrimental effect.

In the said Patent No. 1,659,135 solutions are described containing arsenious oxid, zinc acetate in quantity substantially only sufficient to react with the arsenious oxid to the formation of zinc meta arsenite, or its equivalent, i. e. a zinc salt other than the acetate, and an acetate of a metal other than zinc in substantially reacting proportions, together with a small amount of free acetic acid to prevent precipitation. An example of such a solution containing the equivalent of 2% of zinc meta arsenite is one containing in 1,000 gallons of water, 120 pounds of arsenious oxid, 142 pounds of zinc acetate trihydrate, and 15 pounds of acetic acid, the quantity of acetic acid being varied slightly with the temperature.

In accordance with the present invention the rate of deposition of the zinc meta arsenite from solutions of the type described is increased by increasing the ratio of zinc ion or the ratio of acetate ion or both to the arsenious oxid content of the solution. It is desirable also slightly to increase the acetic acid content of the solution in order to prevent premature precipitation of the zinc meta arsenite.

The following is a specific example of a solution in accordance with the present invention.

| | |
|---|---|
| Water | 1,000 gallons |
| Arsenious oxid | 120 pounds |
| Zinc acetate trihydrate | 213 pounds |
| Acetic acid (100%) | 25 pounds |

This solution contains the equivalent of 2% of zinc meta arsenite. It is evident that the concentration of the solution may be varied to vary the amount of zinc meta arsenite applied to the wood for a given volume of impregnation and that the ratio of zinc acetate to arsenious oxid may be varied to vary the rate of deposition of the zinc meta arsenite.

The foregoing example illustrates the use of excess zinc acetate, i. e. excess of both zinc ion and acetate ion in equal amount for accelerating the precipitation of the zinc meta arsenite. It is to be understood, of course, that just as zinc acetate may be supplied to the solutions of the Patent No. 1,659,135, above referred to, as such or in the form of a soluble zinc salt other than the acetate and a soluble acetate other than that of zinc, so also may be excess of zinc and acetate ions of the solutions of the present invention be supplied in the form of zinc acetate or in the form of other zinc salts and other acetates. As stated, the acceleration of the precipitation of the zinc meta arsenite may be brought about by the use of an excess of both zinc ions and acetate ions, i. e. by the use of zinc acetate or its equivalent, but worth while increases in the rate of precipitation may be obtained by the use of excess zinc ions alone or an excess of acetate ions alone. It follows that excess zinc ions and excess acetate ions may be used together in any desired relative proportion to each other. Excess acetate ion is in general more effective in increasing the rate of precipitation of the zinc meta arsenite than is excess zinc ion.

Thus instead of using an excess of zinc acetate as shown in the foregoing example we may use an excess only of a zinc salt other than the acetate; for example, zinc chloride or sulfate, or an excess only of an acetate other than zinc acetate; for example, calcium acetate, sodium acetate, potassium acetate or ammonium acetate, or an excess of both types of salts in any proportion to each other may be used. The use of acetates or zinc salts other than zinc acetate, although not as effective as zinc acetate, may be justified by price considerations.

It is evident that the excess zinc or acetate salt will not be consumed in the formation of zinc meta arsenite, but the use of the excess is justified by the increase in the rate of precipitation of the zinc meta arsenite and the use of excess zinc salt also is further justified in some instances by its preservative action on the wood.

In the foregoing example the excess of zinc acetate over arsenious oxid is about 50%. A useful acceleration of the rate of deposition of the zinc meta arsenite is obtained, however, by the use of as little as 10% excess of zinc acetate. A practical upper limit for the excess of zinc acetate is 100%. A greater excess may be used and is operative, but is regarded as being uneconomical.

The use of acetates and acetic acid in the solutions is preferred, but other volatile acids, such as formic acid, are operative and may be used without departing from our invention.

This application is a continuation-in-part of our application Serial No. 648,142, filed Dec. 20, 1932.

We claim:

1. Method of preserving vegetable fibrous materials which comprises impregnating the same with a solution adapted to deposit zinc meta arsenite on exposure to the atmosphere, said solution being composed of arsenious oxid, a soluble zinc salt of a volatile acid in quantity sufficient to react with the arsenious oxid content of the solution to the formation of zinc meta arsenite, free volatile acid in quantity sufficient to prevent premature precipitation of the zinc meta arsenite and an additional soluble metal salt providing an excess of at least one of the ions of said soluble zinc salt.

2. Method of preserving vegetable fibers as defined in claim 1 in which the additional soluble metal salt is a salt containing the acid ion of said soluble zinc salt.

3. Method of preserving vegetable fibers as defined in claim 1 in which the additional soluble metal salt is a zinc salt.

4. Method of preserving vegetable fibers as defined in claim 1 in which the additional soluble metal salt is identical with said soluble zinc salt of a volatile acid.

5. Method of preserving vegetable fibers as defined in claim 1 in which the soluble zinc salt of volatile acid is zinc acetate and in which the additional soluble metal salt is an acetate.

6. Method of preserving vegetable fibers as defined in claim 1 in which the soluble zinc salt of volatile acid is zinc acetate and in which the additional soluble metal salt is a zinc salt.

7. Method of preserving vegetable fibers as defined in claim 1 in which the soluble zinc salt of volatile acid is zinc acetate and in which the additional soluble metal salt is zinc acetate.

8. As an insecticidal and fungicidal composition a solution capable of depositing zinc meta arsenite on exposure to the atmosphere and composed of arsenious oxid, a soluble zinc salt of a volatile acid in quantity sufficient to react with the arsenious oxid content of the solution to the formation of zinc meta arsenite, free volatile acid in quantity sufficient to prevent premature precipitation of the zinc meta arsenite, and an additional soluble metal salt providing an excess of at least one of the ions of said soluble zinc salt.

9. A solution as defined in claim 8 in which the additional soluble metal salt is a salt of the acid ion of said soluble zinc salt.

10. A solution as defined in claim 8 in which the additional soluble metal salt is a zinc salt.

11. A solution as defined in claim 8 in which the additional soluble metal salt is identical with said soluble zinc salt of a volatile acid.

12. A solution as defined in claim 8 in which the soluble zinc salt of a volatile acid is zinc acetate and the additional soluble metal salt is an acetate.

13. A solution as defined in claim 8 in which the soluble zinc salt of a volatile acid is zinc acetate and the additional soluble metal salt is a zinc salt.

14. A solution as defined in claim 8 in which the soluble zinc salt of a volatile acid is zinc acetate and the additional soluble metal salt is zinc acetate.

LEO P. CURTIN.
WILLIAM THORDARSON.